(12) United States Patent
Wang et al.

(10) Patent No.: US 10,128,921 B2
(45) Date of Patent: Nov. 13, 2018

(54) MULTI-USER MULTIPLE-INPUT MULTIPLE-OUTPUT (MU-MIMO) OPERATION AND USER SELECTION

(71) Applicant: MEDIATEK INC., Taiwan (CN)

(72) Inventors: James June-Ming Wang, San Marino, CA (US); Jianhan Liu, San Jose, CA (US)

(73) Assignee: MEDIATEK, INC., Hsin-Chu (TW)

( * ) Notice: Subject to any disclaimer, the term of this patent is extended or adjusted under 35 U.S.C. 154(b) by 12 days.

(21) Appl. No.: 15/499,730

(22) Filed: Apr. 27, 2017

(65) Prior Publication Data

US 2017/0317727 A1 Nov. 2, 2017

Related U.S. Application Data

(60) Provisional application No. 62/328,036, filed on Apr. 27, 2016, provisional application No. 62/357,400, filed on Jul. 1, 2016, provisional application No. 62/363,375, filed on Jul. 18, 2016, provisional application No. 62/363,923, filed on Jul. 19, 2016.

(51) Int. Cl.
*H04B 7/0452* (2017.01)
*H04B 7/06* (2006.01)

(52) U.S. Cl.
CPC ......... *H04B 7/0452* (2013.01); *H04B 7/0617* (2013.01); *H04B 7/0626* (2013.01)

(58) Field of Classification Search
CPC .. H04B 7/0452; H04B 7/0617; H04B 7/0626; H04B 7/04; H04B 7/088; H04B 7/0413; H04B 7/0695; H04L 25/0204; H04L 25/0224; H04W 16/28
See application file for complete search history.

(56) References Cited

U.S. PATENT DOCUMENTS

| 9,225,401 | B2* | 12/2015 | Wang | H04B 7/0695 |
| 2013/0107916 | A1 | 5/2013 | Liu et al. | |
| 2013/0315325 | A1* | 11/2013 | Wang | H04B 7/043 375/267 |
| 2017/0156067 | A1* | 6/2017 | Huang | H04W 16/28 |
| 2017/0317727 | A1* | 11/2017 | Wang | H04B 7/0452 |

OTHER PUBLICATIONS

James Wang( Mediatek),"11ay DL MU-MINO BF Training and User Selection", IEEE-SA Mentor, pp. 1-17, vol. 802.11ay, Mar. 14, 2016. Piscataway, NJ, USA.

(Continued)

*Primary Examiner* — Benjamin H Elliott, IV

(57) ABSTRACT

System and method of Multi-User Multiple-Input Multiple-Output (MU-MIMO) Beamforming communication. An MU-MIMO BF training session is used to train all the responders in a user group in relation to an initiator having multiple antenna arrays. Accordingly, suitable TX-RX sector pairs are selected based on the training results, and the user group is arranged into subsets such that the initiator can transmit data to the responders in one subset simultaneously by using mutually orthogonal BF waveforms. Prior to the MU-MIMO BF training session, the initiator can select TX sectors of the TX antennas and responders for the training session based on results from a prior or preliminary SISO BF training.

29 Claims, 14 Drawing Sheets

(56) References Cited

OTHER PUBLICATIONS

James Wang (Mediatek),"Scalable Beamforming for 11ay", IEEE-SA Mentor, pp. 1-13, vol. 802.11ay, Jan. 18, 2016. Piscataway, NJ, USA.
Assaf Kasher (Intel),"Beamforming—Training—update", IEEE-SA Mentor, pp. 1-15, vol. 802.llay, Jan. 19, 2016. Piscataway, NJ, USA.

* cited by examiner

| Packet Type | Addresing | CDOWN | RF Chain ID | Addressing Mode | Setup Duration | Direction |
|---|---|---|---|---|---|---|
| 2 | 16 | 11 | 2 | 1 | 10 | 1 |
| Bits | | | | | | |

FIG. 3

MULTI-USER MULTIPLE-INPUT MULTIPLE-OUTPUT (MU-MIMO) OPERATION AND USER SELECTION

CROSS REFERENCE TO RELATED APPLICATIONS

This application claims priorities to and benefit of: U.S. Provisional Patent Application No. 62/328,036, filed on Apr. 27, 2016, entitled "DL MU-MIMO Operation and User Selection;" U.S. Provisional Patent Application No. 62/357,400, filed on Jul. 1, 2016, entitled "MU-MIMO BF Operation and User Selection Updates;" U.S. Provisional Patent Application No. 62/363,375, filed on Jul. 18, 2016, entitled "SU and MU MIMO Beamforming Protocol;" and U.S. Provisional Patent Application No. 62/363,923, filed on Jul. 19, 2016, entitled "SU and MU MIMO Beamforming Protocol." The foregoing patent applications are herein incorporated by reference in entirety for all purposes.

TECHNICAL FIELD

The present disclosure relates generally to the field of network communication, more specifically, to the field of wireless network communication protocols.

BACKGROUND OF THE INVENTION

In a Downlink (DL) Multi-User Multiple-Input Multiple-Output (MU-MIMO) system, an access point (AP) with multiple antennas can simultaneously transmit data to multiple wireless terminal stations (STAs) by spatial multiplexing via different spatial paths. Due to spatial multiplexing, MU-MIMO offers the advantages of high peak throughput of data transmission. Additionally, MU-MIMO can reduce the number of channel accesses and thereby reduce overhead time associated with using short packets. Therefore, significant aggregation gain can be achieved.

Digital beamforming has been widely adopted by wireless communication systems, e.g., systems compliant with IEEE 802.11ac (5 GHz), which typically use omni-antennas for non-Line-Of-Sight (NLOS) MU-MIMO communication. Due to the relatively long wavelength used for signal transmission, propagation directionality is typically poor. Digital beamforming for MU-MIMO, based on the null space operation, for each spatial stream transmission all the receiving wireless stations except for the target receiving wireless station are in the nulls, is susceptible to fast channel aging. To combat channel aging, frequent sounding and feedback processes are used (for instance greater than 50 times/sec at 5 GHz), but these processes inevitably contribute to substantial overhead time. Further, the data traffic needed for reporting Channel State Information (CSI) increases with the number of antennas and the number of STAs used in a system. This inhibits the system's ability to scale up a user group.

For higher frequency systems (e.g., 60 GHz), the wavelength is very small compared to the feature sizes of objects in the propagation environment. Therefore, signal propagation at such a high frequency is less affected by the propagation environment and therefore can maintain high directionality in discrete spatial paths, making these systems suitable for analog beamforming using directional phased-array antennas. Null space type of digital beamforming suffers much fast channel aging at the short wavelength (aging rate proportional to the frequency), and is generally only used as an enhancement after analog beamforming is accomplished.

MU-MIMO, unlike SU-MIMO, can transmit multiple spatial streams via LOS transmission to multiple users. LOS MU-MIMO transmission can potentially provide even higher throughput and longer beam range because of mitigated path and reflection loss as normally associated with NLOS-MIMO transmission.

Hybrid beamforming combines analog beamforming and digital beamforming processing, and has been acknowledged to be a more reliable approach for MU-MIMO millimeter-wave (mmWave) beamforming communication than digital beamforming.

SUMMARY OF THE INVENTION

Accordingly, disclosed herein is directed to a beamforming (BF) training protocol that enables Multi-User Multiple-Input Multiple-Output (MU-MIMO)-capable initiator and responders in an MU group to establish antenna transmission configurations which allow the initiator to transmit data to the responders with reduced inter-stream interference as well as reduced overhead time.

Embodiments of the present disclosure utilize one MU-MIMO BF training session to train all the responders in a first user group in relation to an initiator having multiple arrays of antennas. Based on the training results, the responders are arranged into subsets via a user selection process, such that in each subset of responders, the selected pairs, where each pair consists of the initiator's transmit (TX) antenna and an associated antenna sector and the responder's receive (RX) antenna and an associated antenna sector (or TX-RX pairs) having satisfactory signal transmission quality and low interference, are identified. Selection of the subset of responders among a larger first user group makes it easier to achieve near mutually orthogonal beamforming. Accordingly, the initiator can transmit data streams to the responders in one subset simultaneously by using near mutually orthogonal beamforming via different spatial paths. Additionally, a large number of responders in the first user group are trained together to reduce the overhead training time.

More specifically, prior to the MU-MIMO BF training session and in a Single Input Single Output (SISO) manner, the initiator obtains signal quality information from the responders in a larger group (a second group) on selected TX sectors for each of the initiator's antennas (each TX antenna). The information may be provided as feedback and may result from an Initiator-Transmit Sector Sweep (I-TXSS) training process. Based on this information, the TX sectors for each TX antenna and responder devices in the second group can both be down-selected for the subsequent MU-MIMO BF training session, thereby advantageously and effectively reducing the required training time.

The initiator then sends setup frames to inform all the selected responders (the first group) about the selected TX sectors for each TX antenna and an order of antenna/sector sweep in the following MU-MIMO BF training session. During the MU-MIMO BF training session, the initiator transmits Beam Refinement Protocol (BRP) frames to the selected responders, where the training fields corresponding to each TX sector in each BRP frame cover the RX sectors of all the selected responders (i.e., the maximum number of RX sectors in one responder among all selected responders) corresponding to all the selected TX sectors of one or more TX antennas. The initiator polls the responders to acquire signal quality information on TX-RX sector pairs resulting from this training session. Based on the feedback from the responders, the first group of responders are divided into subsets. For each subset, an MU-MIMO transmission configuration is generated. The initiator can sequence through the subsets for MU-MIMO data transmissions according to respective transmission configurations. Each configuration specifies the initiator to use mutually orthogonal beamforming to simultaneously transmit data streams to the responders in a subset.

Therefore, according to embodiments of the present disclosure, one MIMO BF training session can be used to train a large number of users and can yield multiple sets of MU-MIMO TX-RX antenna transmission configurations. This can advantageously reduce MIMO BF training time. The training also effectively enables simultaneous MU-MIMO data transmission with low inter-stream interference, especially in LOS MU-MIMO applications.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

FIG. 3 illustrates an exemplary short SSW frame format used in the SISO feedback subphase in accordance with an embodiment of the present disclosure.

DETAILED DESCRIPTION

Figure 1:
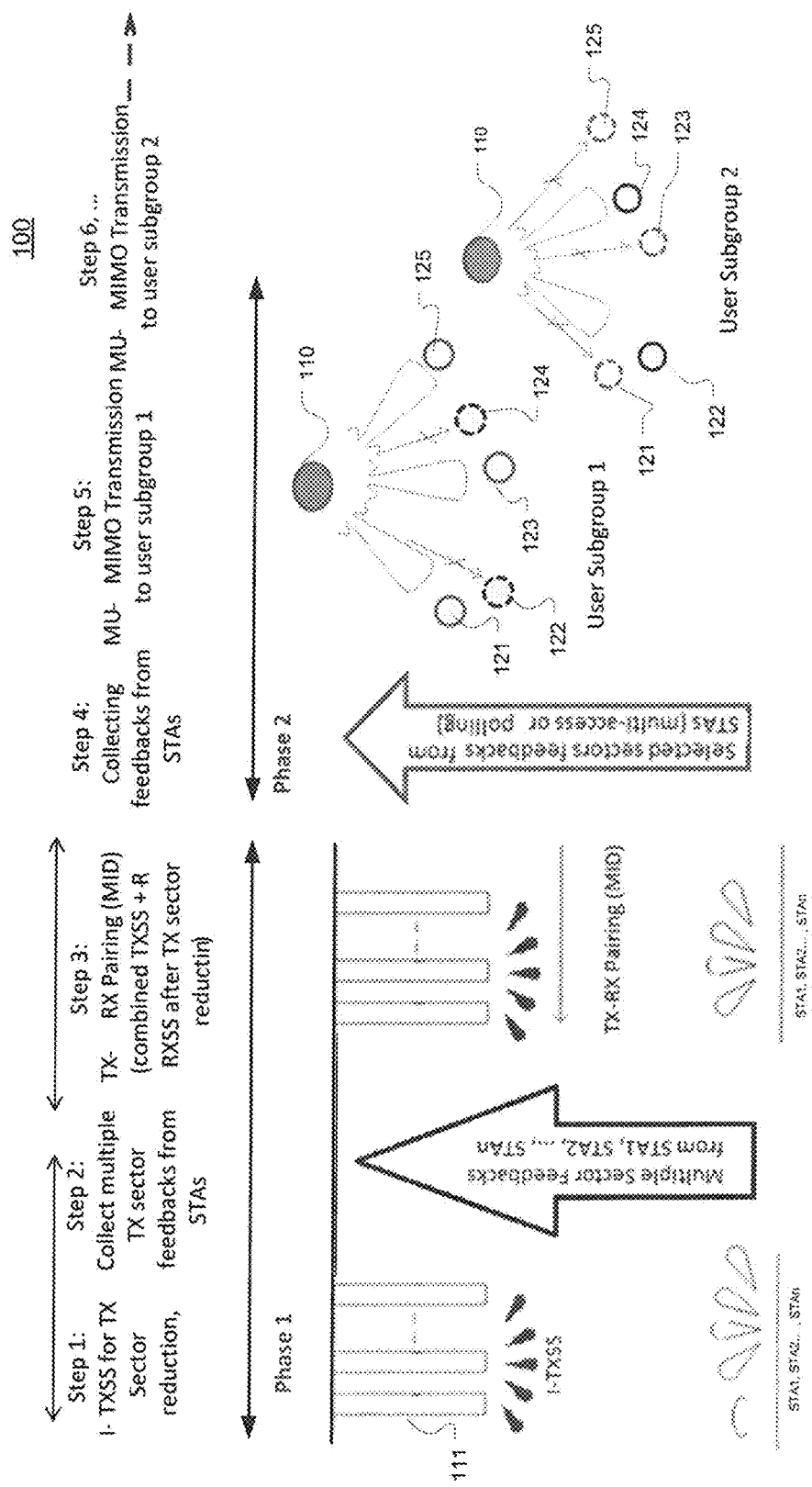
FIG. 1 depicts exemplary steps in diagram form of an exemplary process of establishing and executing MU-MIMO communication in a Basic Service Set (BSS) in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Overall, embodiments of the present disclosure provide a training mechanism of establishing wireless MU-MIMO communication paths between an initiator device and responder devices, and in one embodiment these could be Enhanced Directional Multi-Gigabyte (EDMG) capability devices. One MU-MIMO BF training session is configured to train all the responders in a user group in relation to an initiator having multiple antenna arrays. Based on the training results, the responders are arranged into subsets via a user selection process, and the selected pairs (where each pair consists of the initiator's transmit (TX) antenna and an associated antenna sector and the responder receive (RX) antenna and an associated antenna sector (or TX-RX pairs))

having satisfactory signal transmission performance are identified. Accordingly, the initiator device can transmit data to the responders in one subset simultaneously by using near mutually orthogonal BF in one embodiment. Embodiments of the present disclosure can be used in both down-link MU-MIMO and upper-link MU-MIMO applications.

FIG. 1 depicts exemplary steps in diagram form an exemplary process 100 of establishing and executing MU-MIMO communication in a Basic Service Set (BSS) in accordance with an embodiment of the present disclosure. The BSS includes an MU-MIMO-capable initiator 110, which may be an Access Point (AP) or a Personal Basic Service Set (PB SS) Control Point (PCP) and may be equipped with one or more Directional Multi-Gigabyte (DMG) antennas (e.g., 111). The BSS also includes multiple MU-MIMO-capable responder devices, e.g., EDMA wireless terminal stations (STAs) (e.g., STA1, STA2, . . . , STAn 121 to 125). There exists a control Physical (PHY) link from the initiator device to each of the intended responders.

It is appreciated that process 100 illustrates an MU-MIMO beamforming training for establishing an antenna transmission configuration in Step 1 to Step 4 which allows the initiator device to transmit EDMG MU Physical Protocol Data Units (PPDU) to the STAs with low interference among the spatial streams in Step 5 and Step 6. Process 100 is initiated and controlled by the initiator device 110. The execution of the process 100 may involve using an EDMG group identifier (ID) set element. For example, the initiator device 110 may transmit the EDMG group identifier (ID) set element prior to performing the MU-MIMI BF training protocol. The group ID set element may include all the existent groups in a BSS. An MU-MIMO-capable EDMG STA may store the group information in the last received EDMG group ID set element transmitted from the initiator 110. Alternately, the initiator device 110 may involve a list of individual identifiers (IDs).

The process 100 generally includes two phases. In the first phase, a one-to-one link between the initiator and each intended responder is established or alternatively may have been previously established. Signal quality information of multiple TX sectors is collected from the responders for purposes of reducing TX sectors and responders participating the MU-MIMO BF training session. In the second phase, an MU-MIMO BF training session is performed and respective MU-MIMO transmission configurations are determined for multiple subsets of responders. MU-MIMO transmission between the initiator and the responders is then performed based on the corresponding transmission configurations.

It will be appreciated that the first phase may be performed in any suitable manner without departing from the scope of the embodiment of the present disclosure. In some embodiments, an Initiator-Transmit Sector Sweep (I-TXSS) training process is optionally executed to produce the signal quality information on one or more suitable antennas/sectors between the initiator 110 and each STA intended to be part of the MU group (Step 1). In a Single Input Single Output (SISO) manner, the initiator collects the signal quality information from the responders (Step 2). In the SISO phase, all transmission uses a DMG control mode for example. The one-to-one beamforming training in the first phase may involve only transmit sector training or it may involve both transmit sector and receive sector training together.

The collected information is used by the initiator device to select suitable TX sectors and suitable responders for the second phase. In Step 3 of FIG. 1, an MU-MIMO BF training session is executed for TX-RX pairing between all the selected responders and the initiator. As described in greater detail below, this can be achieved by specifying all the RX sectors of the selected responders corresponding to each of the selected TX sectors of the initiator in the training fields of a BF training frame.

The MU-MIMO BF training session may include one or more of TXSS, RX sector sweeping (RXSS) and beam combination training. In a TXSS process, the initiator sends training packets through all the selected TX sectors, while the responder receives the training packets with an omni-direction beam. In an RXSS process, the initiator sends training packets with an omni-direction beam, while the responder receives the training packets through all the selected RX sectors. In a beam combination training process, the initiator and responder sweep through the selected TX sectors and RX sectors together. In some embodiments, the training of RX sectors of all responders concurrently can be accomplished with all responders configure to sweep their RX sectors together. Thus, the number of RX training fields (in each frame) corresponds to the maximum number of RX sector among all responders (not the sum of the RX sectors of all responders). This significantly reduces the training overhead and scalability to a large group of responders.

For example, during a TX-RX pairing process, the initiator sweeps through TX-RX pairings. Multiple antennas can transmit simultaneously using orthogonal waveforms to further reduce beamforming training time. A responder can sweep through its RX sectors, which may be configured to receive from multiple antennas simultaneously, resolvable via orthogonal waveforms. However, the present disclosure is not limited to any specific process and method in an MU-MIMO BF training session.

In Step 4, the initiator device collects feedback from the responders to obtain the MU-MIMO BF training results, such as by polling or multi-access communication. Accordingly, the responders are arranged into multiple subgroups such that the initiator can transmit data to the responders in one subset simultaneously by using orthogonal BF and with low inter-stream interference. In the illustrated example, in Step 5, the initiator 110 transmits simultaneous spatial streams to the responders 121, 123 and 125 in subgroup 1; and in the following Step 6, the initiator transmits simultaneous spatial streams to the responders 122 and 124 in subgroup 2.

Generally, MU-MIMO data transmission can advantageously provide high throughput based on simultaneous Line-Of-Sight (LOS) beamformed transmission to multiple users. User separation can be based on antenna beams. Comparing to the NLOS MU-MIMO approach that relies on sounding and feedback (as adopted in IEEE 802.11ac), LOS MU-MIMO can advantageously allow a user group to scale up because any two users within the same TX sector (or TX antenna beam) can be assigned to different MU-MIMO antenna configurations. Accordingly, antenna beams can be transmitted to the two users in separate MU-MIMO transmissions along the same spatial path and without interference to each other. According to the present disclosure, this can be achieved by assigning users widely-separated from each other (in term of MIMO capacity metric, signal-to-noise-plus-interference metric or even orientations with reference to the initiator) to one MU-MIMO antenna transmission configuration. Comparing to the traditional beamforming training method, where the number of responders in the training is typically equal to the number of recipient in a MU-MIMO antenna configuration, the user selection process according to embodiments of the present disclosure has a higher degree of freedom in selecting the subset of responders with near orthogonal beamforming. Also, multiple MU-MIMO antenna transmission configurations for the MU group can be determined by using one training session. Moreover, if orthogonal waveforms are used, multiple TX antennas can be trained simultaneously. This can significantly and advantageously reduce the required training time for MU-MIMO communication.

Figure 2:
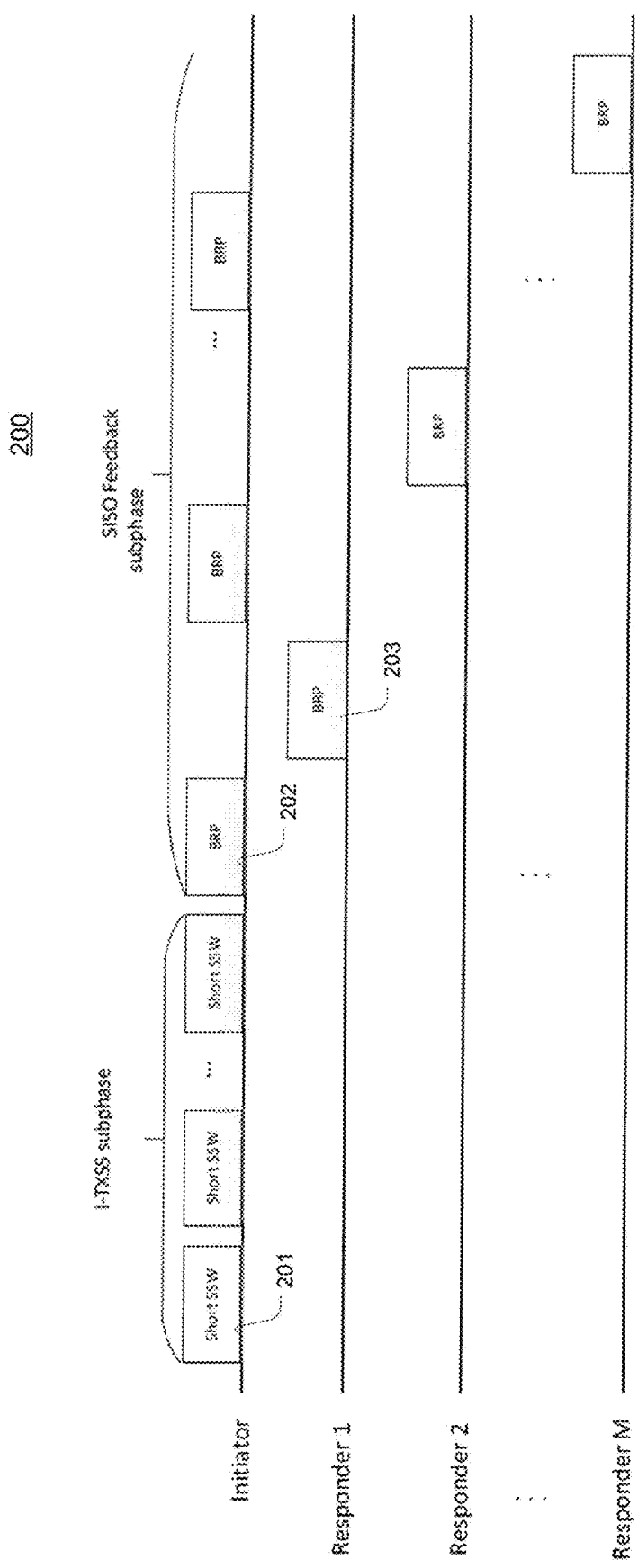
FIG. 2 depicts the frame exchanges in an exemplary communication process of an SISO phase to determine TX sector reduction prior to an MU-MIMO BF training session in accordance with an embodiment of the present disclosure.

FIG. 2 depicts an exemplary communication process 200 in an SISO phase to determine TX sector reduction prior to an MU-MIMO BF training session in accordance with an embodiment of the present disclosure. Process 200 corresponds to the first phase shown in FIG. 1 and sets up for the subsequent MU-MIMO BF training and transmission. Process 200 may include an I-TXSS subphase and an SISO feedback subphase. Control PHY transmission and quasi-omni reception may be used for process 200.

The I-TXSS subphase may be performed to discover all the suitable links with the intended responders. More particularly, following the I-TXSS, the initiator device can obtain feedback from the responders in the MU group on one or more sectors for each of the initiator's TX DMG antenna. In some embodiments, this subphase may be omitted if all the suitable links with the intended responders are known. It will be appreciated that in different embodiments, various criteria may be used for selection of suitable links.

The initiator may initiate the I-TXSS subphase by transmitting short Sector Sweep (SSW) packets or frames (e.g., packet 201). For example, in each short SSW packet transmitted as part of the I-TXSS, the initiator device may set a "Direction" field to 0, set the "Addressing Mode" field to indicate MU-MIMO, and set the "Destination Association ID" field to contain a group ID announced by the initiator in the last transmitted EDMG group ID set element. In addition, a countdown field ("CDOWN") can be set to the number of short SSW packets remaining until the end of the I-TXSS subphase. A setup duration field can be set to the duration of the following SISO feedback subphase.

Upon receiving a short SSW packet indicating MU-MIMO transmission, an MU-MIMO-capable EDMG STA (a responder) may be able to determine whether it is an intended recipient of the packet by matching the value of the Destination association ID (AID) in the packet with the value of the EDMG group ID field contained the last received EDMG group ID set element. It should be noted that the EDMG STA is an intended recipient of the packets if its AID is included in the EDMG group ID field of the corresponding group. Otherwise, the STA is not an intended recipient of the packet and can ignore the remaining of the I-TXSS and SISO feedback subphase. In this situation, the STA can remain unresponsive based on the value of the "CDOWN" and "Setup Duration" fields contained in the received short SSW packet.

The initiator can initiate the SISO feedback subphase, for example, after a Medium Beamforming Interframe Space (MBIFS) following the end of the I-TXSS subphase. During the SISO feedback subphase, the initiator transmits a Beam Refinement Protocol (BRP) frame (e.g., frame 202) to poll each responder intended to be part of the MU group to obtain a list of TX sectors of each TX DMG antenna, and their associated quality indicators. In response to a received BRP frame, a responder transmits a response BRP frame (e.g., 203) which identifies the TX sectors for each TX DMG antenna of the initiator device and the quality indicators associated with the TX sectors. A responder can transmit a response BRP frame after a Single Interframe Space (SIFS) following the reception of the corresponding BRP frame.

In some embodiments, the initiator device and the responders exchange DMG SISO setup frames and DMG SISO setup response frames to collect feedback and set up for the second phase. The duration field of each DMG SISO setup frame or DMG SISO setup response frame can point to the end of the first phase. A channel measurement feedback element, or a modified version thereof, can be included in the DMG SISO setup response frame and includes a list of received sectors/antennas and their corresponding Signal-to-Noise Ratio (SNR) or Received Signal Strength Indicator (RSSI).

FIG. 3 illustrates an exemplary short SSW frame or data format used in the SISO feedback subphase in accordance with an embodiment of the present disclosure. A short SSW frame (e.g., 201) may include a field indicating whether the packet is transmitted as part of an I-TXSS process. A space may be reserved for an I-TXSS process and allocated for the short SSW feedback field. This space may be reused.

The "Setup Duration" field may have 10 bits and may be defined to specify the duration (e.g., in microseconds) of the setup subphase which starts after the short SSW frame with "CDOWN"=0. This allows the STAs that receive the short SSW frames to determine the end of the first phase. For instance, the maximum duration may be set sufficient for up to 16 frame exchanges using Modulation and Coding Scheme 0 (MCS0).

Figure 4:
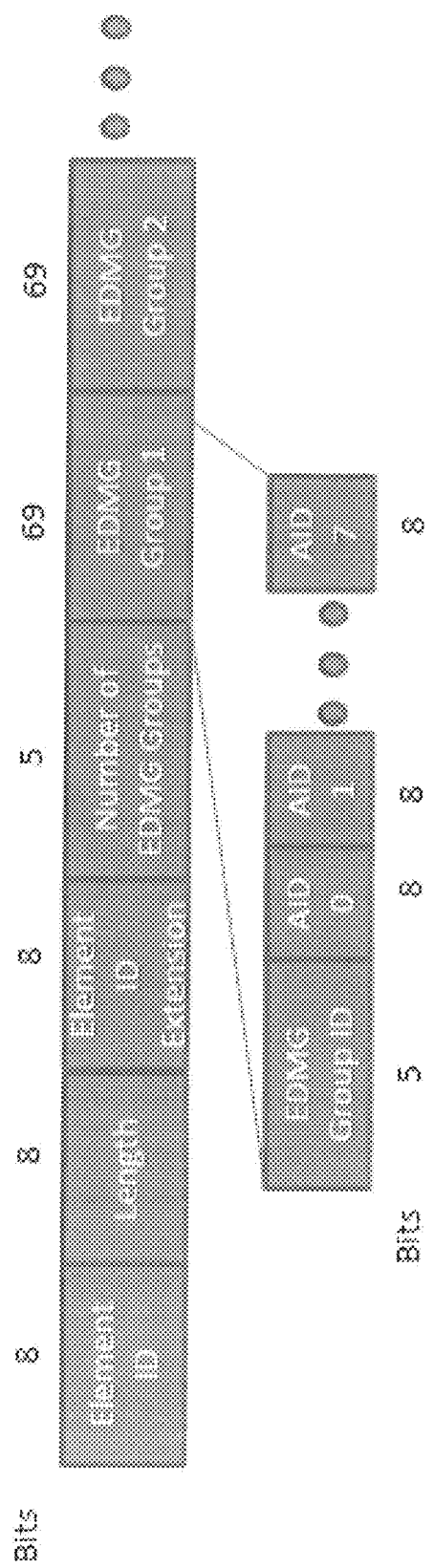
FIG. 4 illustrates an exemplary addressing format used in the short SSW packets in accordance with an embodiment of the present disclosure.

It is useful that STAs can determine quickly whether they are part of the BF training session. This may allow the STAs to determine whether to stay awake or doze. This can be achieved through specified values in an addressing field in a SSW packet. FIG. 4 illustrates an exemplary addressing field format in a short SSW packet in accordance with an embodiment of the present disclosure.

In this example, the addressing mode field in the packet has 1 bit and indicates whether the addressing field in the short SSW packet should be interpreted as an individual/broadcast address or group address. Single User (SU)-MIMO BF flow can be used in case of an individual address, while MU-MIMO BF flow can be used in case of a broadcast/group address. If group mode address is used, a new EDMG group ID set element may be defined to associate a group ID with a group of STAs. The EDMG group ID set element can be transmitted in DMG beacon and announcement frames. The Initiator may be responsible to ensure that the STAs have up-to-date information on the groups. All the existent groups may be included in the EDMG group ID set element. In this way, an EDMG STA that receives a group addressed short SSW can determine whether they are part of the BF training session.

Figure 5:
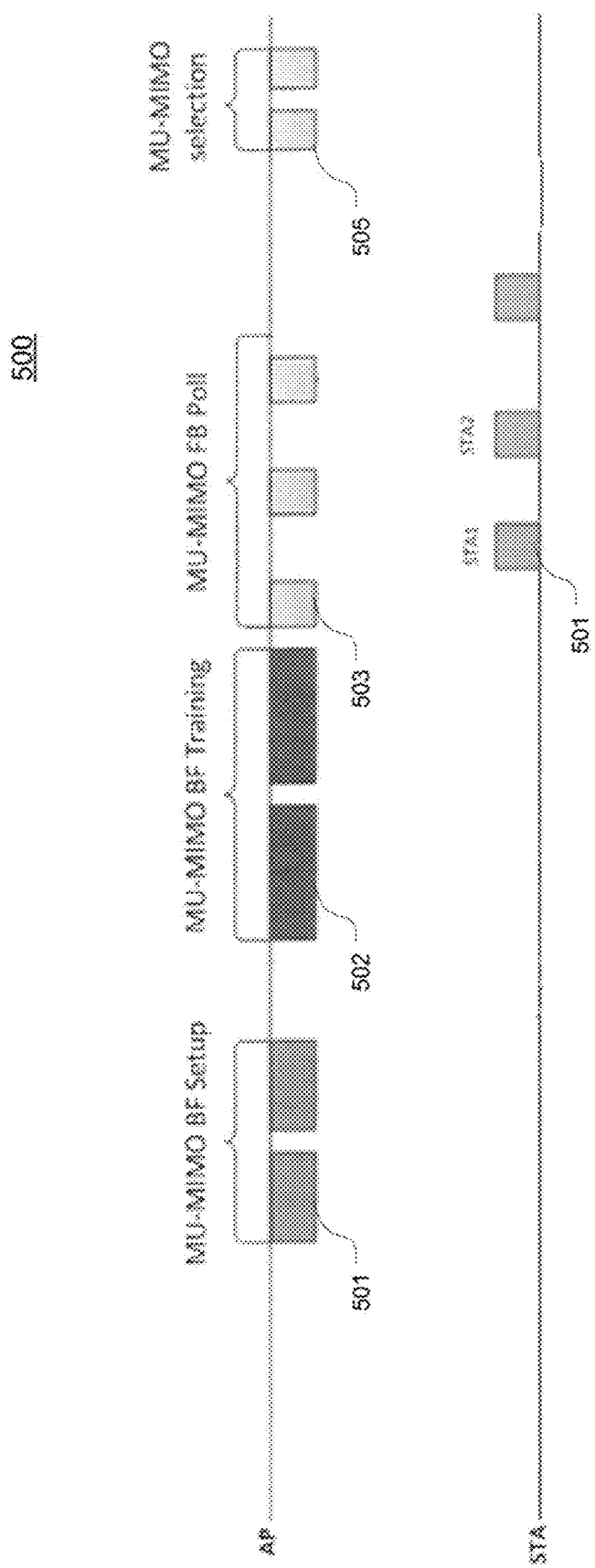
FIG. 5 depicts the frame exchanges in an exemplary communication process in a MIMO phase of MU-MIMO BF training between an initiator and STAs in an MU in accordance with an exemplary embodiment of the present disclosure.

FIG. 5 depicts an exemplary communication process 500 of the MIMO phase for MU-MIMO BF training between an initiator and STAs in an MU in accordance with an exemplary embodiment of the present disclosure. The initiator may start process 500 after an MBIFS following the end of the first phase. This MIMO phase generally includes four subphases, namely, an MU-MIMO BF setup subphase, an MU-MIMO BF training subphase, an MU-MIMO feedback poll subphase, and an MU-MIMO selection subphase. The subphases may be separated from each other by MBIFS.

In some embodiments, based on the feedback from the SISO phase (the first phase) and in the MU-MIMO BF setup subphase, the initiator may determine that multi-user interference due to MU-MIMO transmission between some responders is negligible and therefore may exclude some responders from the following MU-MIMO BF training subphase and the MU-MIMO poll subphase. If all of the responders are excluded, the following MU-MIMO BF training suphase and MU-MIMO BF poll subphase can be omitted in the second phase.

In the MU-MIMO BF setup subphase, the initiator can transmit a BF setup frame (e.g., 501) to each intended responder. For example, the frame indicates: the AID of each remaining responder; the training type (the MU-MIMO training); a unique dialog token identifying the MU-MIMO training session; a number of TX DMG antennas employing orthogonal waveforms for transmitting spatial streams simultaneously; and the order of training the TX sectors. In addition, in one embodiment, the information in the BF setup frame set can be organized as:

Number RX TRN fields for each TX sector,
BRP1: An (No of MUX ants in BRP frame 1), Ant index Xi, sector index S1, S2, . . . , Sn, Ant index Xj, sector index S1, S2, . . . , Sm, . . . ,
. . .
BRPk: An (No of MUX ants in BRP frame 1), Ant index Xi, sector index S1, S2, . . . , Sn, Ant index Xj, sector index S1, . . . , S2, Sm, . . . .

To reduce the MU-MIMO training time, the initiator may select a subset of TX sectors for each DMG antenna and the number of receive training fields based on the feedback from the responders received at the SISO phase.

In some embodiments, the initiator transmits a BF setup frame to multiple responders within the same transmit sector concurrently to reduce the number of BF setup frames transmitted to reach all the responders. All the frames transmitted during the MU-MIMO BF setup subphase can be sent using a DMG control PHY mode. A responder with its AID not matching any AID included in the received BF setup frame can ignore the frames transmitted in the following MU-MIMO BF training subphase and the MU-MIMO BF poll subphase.

In the MU-MIMO BF training subphase, the initiator can transmit BRP frames (e.g., 502) using the EDMG Control PHY. Each transmitted BRP frame is used to train one or more TX sectors and, for each TX sector, and a number of RX Antenna Weight Vectors (AWVs) (corresponding to a RX antenna sector). In each BRP frame, the initiator may include, for each selected sector, TRN-Units in the "TRN" field for intended responders to perform initiator TX sector training and responder RX sector training. The number of TRN-Units included in the TRN field for each TX sector may equal to the maximum number of RX sectors across all the remaining intended responders that are selected based on the feedback in the SISO phase.

An initiator device may transmit a BRP frame with orthogonal waveforms to train multiple (e.g., up to 4) TX DMG antennas simultaneously through the same BRP frame and hence reduce the training time. For instance, the MU-MIMO BF training subphase can be performed by setting, in a BRP frame, the "TXVECTOR" parameter "EDMG_TRN_LEN" to a value greater than zero and setting the parameter "RX_TRN_PER_TX_TRN" to a value greater than one in one example.

In the MU-MIMO feedback poll subphase, the initiator can transmit a BF poll frame (e.g., frame 503) to poll each remaining intended responder to collect feedback of the preceding MU-MIMO BF training subphase. Each BF poll frame and BF feedback frame (e.g., frame 504) sent back by the corresponding responder can be separated by an SIFS. Each poll frame may carry a dialog token that identifies the MU-MIMO training.

The STAs can feedback TX-RX sector pair combinations in a requested format as indicated in the poll frame. More specifically, a BF feedback frame carries the list of received initiator's TX DMG antennas/sectors, each with its corresponding responder's RX DMG antenna/sector and the associated quality indicator, such as RSSI. Alternately, signal-to-noise ratio or MIMO capacity may be used as the quality factor. For more sophisticated implementations, channel state information (CSI) can be used as a quality indicator.

In some embodiments, an initiator device may engage individual R-TXSS by assigning fixed slots in a fixed sub-channel number) for some STAs to re-establish responder link, for example, if the responder link breaks before the start of the second phase. The initiator may assign fixed slots for contention. A polled responder may perform a R-TXSS process in the indicated fixed slots to establish or re-establish a responder link. The initiator may poll again after the responder link is re-established for the MU-MIMO BF feedback.

In the MU-MIMO selection subphase, the initiator device can select subsets of users for different MU-MIMO transmission configurations based on the feedback. The selection can be based on responder-received signal strength and/or interference level information. Alternately, the MU-MIMO capacity metric can be computed using channel state information (CSI). For non-beamformed cases, each MMO transmission configuration may contain a subset of responders, where the number of responders in the subset is no more than the number of TX antennas. Each TX antenna/sector, which corresponds to a respective spatial stream, is assigned an RX antenna sector from a responder, forming a TX-RX pair. The responders in one subset are assigned to different TX antennas.

For beamformed cases, each MMO transmission configuration contains a subset of responders, where the number of responders in the subset is no more than the number of spatial streams. Each spatial stream is assigned an RX antenna/sector of a responder, forming a TX-RX pair. Each responder may receive the information of all the responders in each transmission configuration.

More specifically, the initiator can transmit BF selection frames (e.g., frame 505) to each responder in the MU group. The BF selection frame in one embodiment includes the dialog token identifying the MU-MIMO training session, one or more multiple sets of the MU transmission configurations, and the intended recipient STAs for each MU transmission configuration. The final set of selected responders in the MU group specified in the BF selection frame does not have to be the same as the initial set of intended responders. The initiator may transmit the minimum number of BF selection frames to reach all the selected responders.

It will be appreciated that the frames communicated between the initiator and the responders in various phases and subphases may be configured in any suitable manner or format, and may contain any suitable fields or any type of suitable information without departing from the scope of the present disclosure. The formats and structures of frames in the embodiments described herein are merely exemplary.

In the MU BF training subphase, long training frames with many training fields may be transmitted. As the number of training fields is independent of the number of STAs being trained, multiple STAs can be trained at one time. By training multiple STAs simultaneously, an optimum MU-MIMO TX-TX antenna configuration can be obtained by user selection among multiple users. Multiple sets of MU-MIMO TX-RX antenna configurations can advantageously be obtained in one training session.

Figure 6:
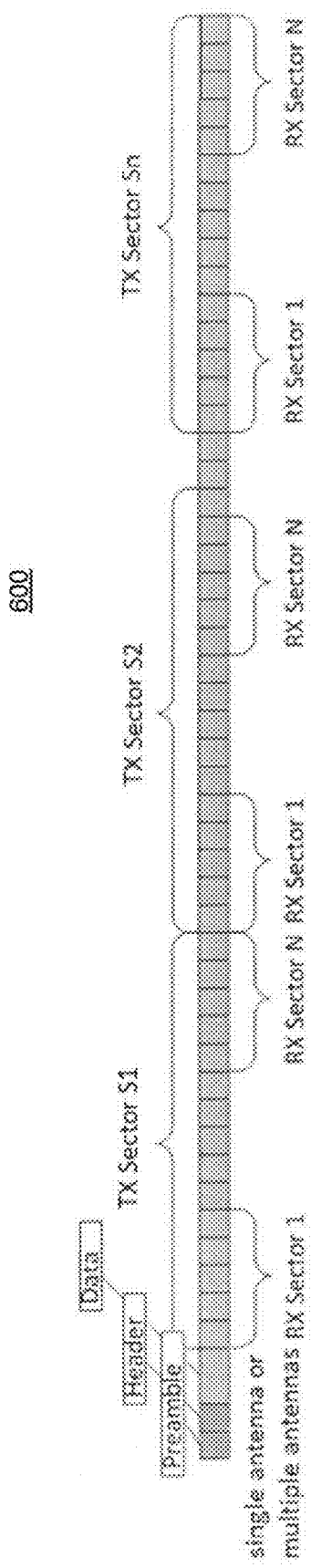
FIG. 6 shows the training fields in an exemplary MU-MIMO BF training frame that is transmitted from an initiator in accordance with an embodiment of the present disclosure.

FIG. 6 shows the configuration of training fields in an exemplary MU-MIMO BF training frame 600 that is transmitted from an initiator device in accordance with an embodiment of the present disclosure. The frame 600 is a BRP frame that specifies training fields for training a single or multiple TX antenna sectors. For each TX antenna, the frame 600 specifies all the selected RX sectors of all the selected responders corresponding to each selected TX sector to perform RX sector training. The frame 600 may allow both TX sector training and RX sector training in the same packet, for instance.

For example, a maximum limit of the training field number may be set to 256. The initiator may be aware of the maximum number of training fields that each STA can process. In the BF training frame 600, the number of RX training fields corresponding to a TX sector may equal to the number of RX sectors in an STA that has the most RX sectors among all the intended STAs.

Figure 7:
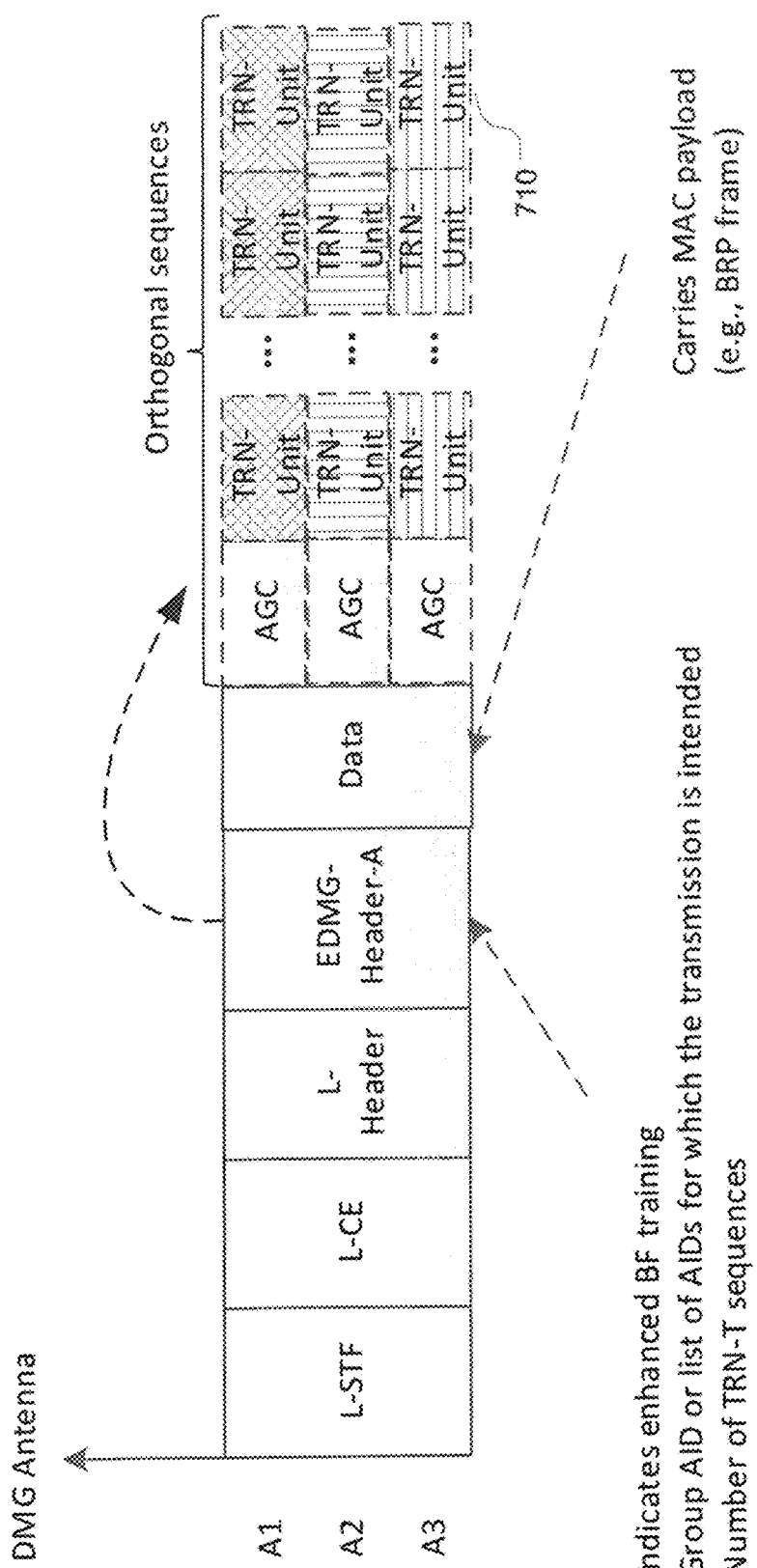
FIG. 7 illustrates an exemplary BRP packet format for an MU-MIMO BF training frame in accordance with an embodiment of the present disclosure.

FIG. 7 illustrates an exemplary BRP packet format for an MU-MIMO BF training frame in accordance with an embodiment of the present disclosure. In this example, the BRP packet is a control PHY packet with training fields specified in "TRN-Unit." Non-training parts in the packets can be transmitted through all the antennas with only small delay between antennas. The training fields can be transmitted concurrently through all the antennas using orthogonal training fields. In the packet, one orthogonal sequence 710 identifies a TX antenna which can be resolved by the receiver processing. This configuration allows training multiple TX antennas simultaneously using a normal BRP training protocol.

The "EDMG-Header-A" may indicate an enhanced BF training mode, a group AID or list of AIDs to which the transmission is directed, the number of TRN-T sequences, and the number of TRN-R sequences per TRN-T sequence. The BRP packet may specify three possible training modes: TX training which may be used by any EDMG STA that receives the frame; RX training in which several SISO STAs can be trained concurrently; and combined training in which RX training is performed for each TX training. Particularly, RX sectors of multiple responders may be trained simultaneously. TX antennas may be trained simultaneously using orthogonal training fields/frames.

In one embodiment, a poll frame (e.g., 502 in FIG. 5) may specify: a BSS ID; an STA (Media Access Control) MAC address or group ID; a sequence number of the MU-MIMO BF training session; and requested feedback information (e.g., in specified metrics and formats), such as RSSI, time domain channel response, Channel State Information (CSI), Channel Quality Indicator (CQI), Received Bit Information Rate (RBIR), compressed or uncompressed, etc. The poll frame may also include an R-TXX indicator, a number of slots, and a channel number, such that the initiator device may poll again for MU-MIMO BF feedback after a response link is established or re-established.

In one embodiment, a poll feedback frame (e.g., 504 in FIG. 5) may specify: a BSS ID; an STA (Media Access Control) MAC address or group ID; a sequence number of the MU-MIMO BF training session; and feedback information as requested, such as RSSI, time domain channel response, CSI, CQI, or RBIR.

In some embodiments, the TX-RX pairing process and sector selection process may use MIMO capacity as a metric to represent CSI feedback. Due to constant-envelop (CE) field waveform, a spatial temporal channel matrix may be used to compute the MIMO capacity. The channel matrix can be defined as:

$$H(\tau, t) = \begin{bmatrix} h_{1,1}(\tau, t) & h_{1,2}(\tau, t) & \ldots & h_{1,M}(\tau, t) \\ h_{2,1}(\tau, t) & h_{2,2}(\tau, t) & \ldots & h_{2,M}(\tau, t) \\ \vdots & \vdots & \ddots & \vdots \\ h_{N,1}(\tau, t) & h_{N,2}(\tau, t) & \ldots & h_{N,M}(\tau, t) \end{bmatrix}$$

where $h_{i,j}(\tau,t)$ represents channel response of $j^{th}$ TX antenna, $i^{th}$ RX antenna pairing. The MIMO capacity can be represented as:

$$C = \log_2\{\det[I_N + (\rho/M)HH^+]\} \text{ in b/s/Hz}$$

In some other embodiments, CSI feedback can be represented by a Signal-to-Interference plus Noise Ratio (SINR). During scalable BF training, the TX antenna/sector and RX antenna/sector pairing are observed by the involved responders. Potential interference or leakage between antenna sectors (which determines the required nulling depth) are also observed. For example, a simplified metric can be used to feedback SINR from each antenna sector for SINR computation. This metric is especially suitable for predominantly analog beamforming applications.

An MU-MIMO selection frame (e.g., frame 505 in FIG. 5) may specify: a group ID; a BSS ID, the number of MU-MIMO transmission configurations. For each MU-MIMO configuration, the frame specifies the beamforming ID, the associated TX antenna sector IDs and STA IDs. For instance, the configuration information in a selection frame is organized as:

MU-MIMO Config_ID 1: (BF1, TX Ant_Sec_ID1/SS_ID1, STA_ID1, RX Ant_Sec_ID1); (BF2, TX Ant_Sec_ID2/SS_ID2, STA_ID2, RX Ant_Sec_ID2), . . .

MU-MIMO Config_ID 2: (BF1, TX Ant_Sec_ID1/SS_ID1, STA_ID1, RX Ant_Sec_ID1); (BF2, TX Ant_Sec_ID2/SS_ID2, STA_ID2, RX Ant_Sec_ID2), . . .

. . .

MU-MIMO Config._N: (BF1, TX Ant_Sec_ID1/SS_ID1, STA_ID1, RX Ant_Sec_ID1); (BF2, TX Ant_Sec_ID2/SS_ID2, STA_ID2, RX Ant_Sec_ID2), . . .

where, the BFi bit indicates TX Ant_Sec_IDi (non-beamformed) or SS_IDi (beamformed).

The initiator may transmit the selection frame in a minimum number of frames using different antennas/sectors that are sufficient to reach all the intended STAs.

Figure 8:
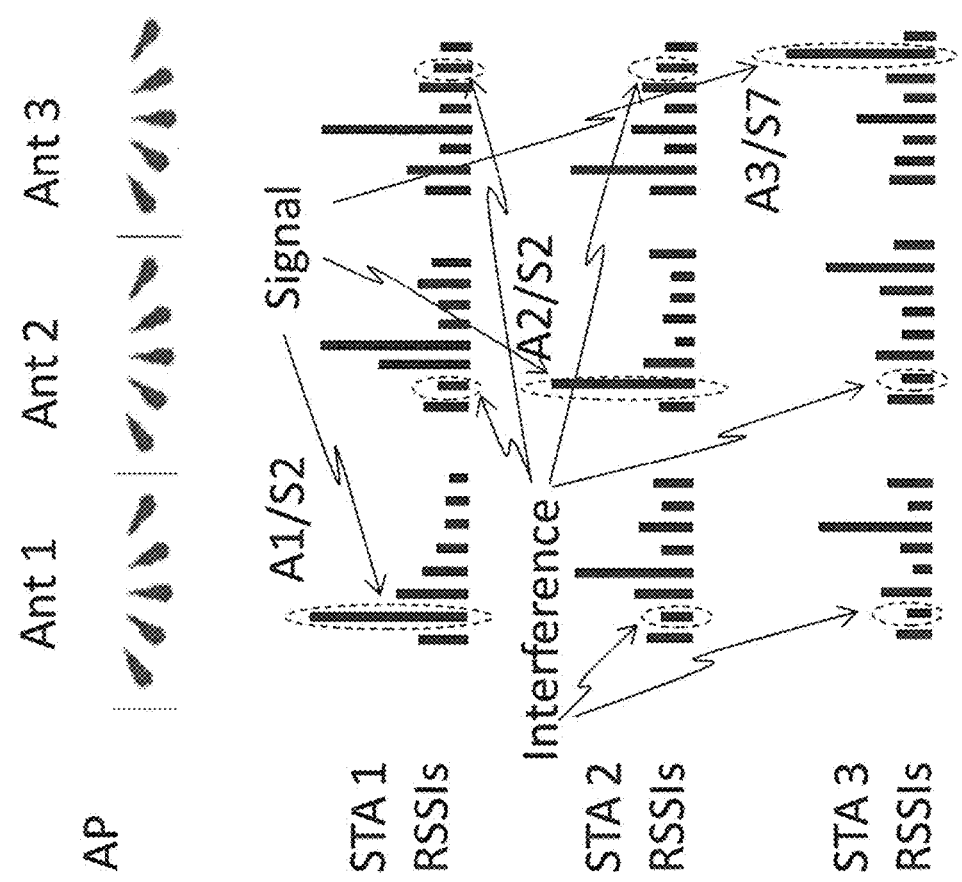
FIG. 8 illustrates diagrams of sample feedback signals from multiple responders and selection of feedback signals for determining SINRs in accordance with an embodiment of the present disclosure.

FIG. 8 illustrates diagrams of sample feedback signals from multiple responders and selection of feedback signals for determining SINRs in accordance with an embodiment of the present disclosure. In this example, STA1, STA2, and STA3 feedback the RSSIs of all the received antenna/sectors resulting from a BF training session. Multiple antennas (Ant1, Ant2 and Ant3) can transmit simultaneously with orthogonal waveforms. The initiator (AP) selects the antenna/sector for each STA based on SINR which is computed by Signal/(Interference+Interference+Noise). For example, for STA1, its BF training with antenna Ant 1 results in a receive signal with a highest strength among the RSSIs of the three TX antennas, and thus is designated as "Signal." Two "Interference" pulses are identified form the RSSIs of the other two antennas. In this manner, it is appreciated that the TX sector-RX sector pairs providing the maximum SINR can be advantageously identified for each responder, which can advantageously reduce the burden of digital processing, e.g., nulling.

Antenna pattern reciprocity refers to the capability of devices transmitting and receiving with the same antenna pattern, via implicit or explicit calibration of other means. Such a device can use its channel knowledge derived from the received signal in its transmission or vice versa. This capability can reduce the overhead of the over-the-air calibration if a device has already been calibrated. If a responder and the initiator have antenna pattern reciprocity, the responder may feedback a responder link TX antenna/sector ID. Thus the poll feedback frame may include a responder link feedback indicator and the selected TX antenna/sector for the responder link.

Figure 9:
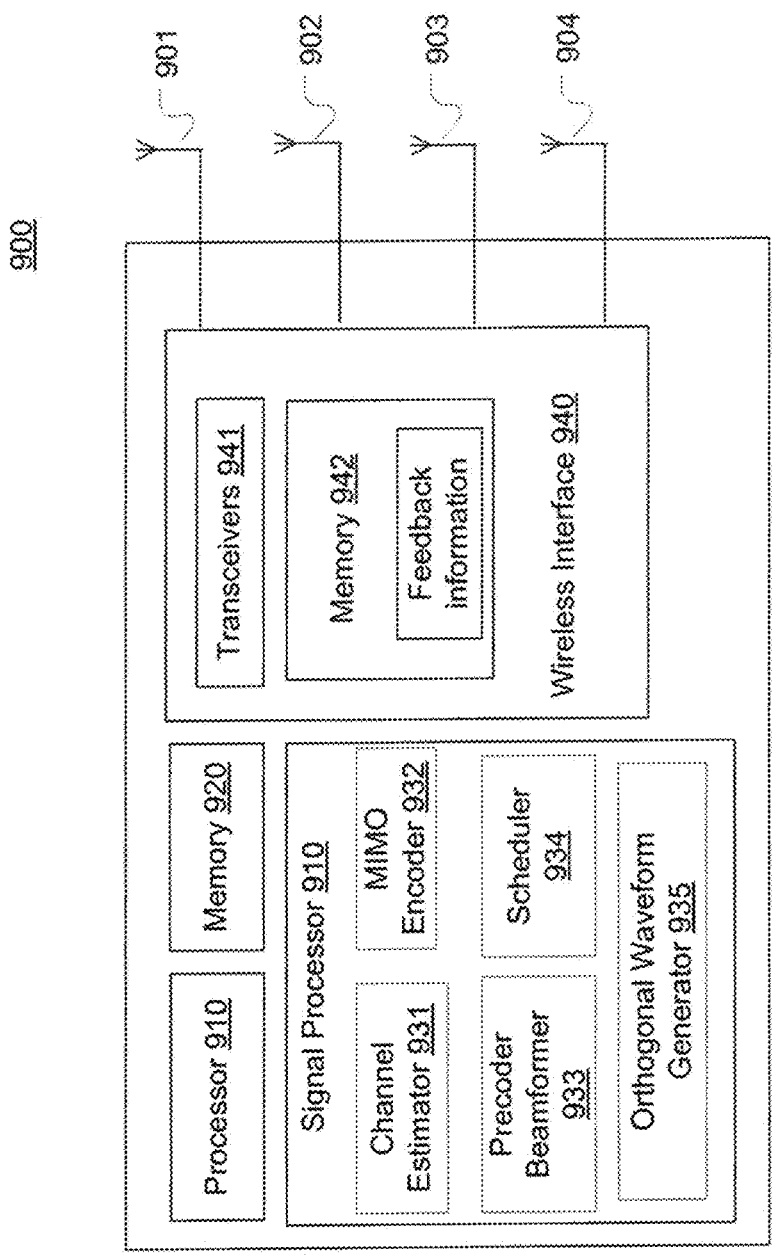
FIG. 9 is a block diagram illustrating the configuration of an exemplary initiator device capable of MU-MIMO data transmission in accordance with an embodiment of the present disclosure.

The present disclosure is not limited to any specific implementation of an initiator or a responder that can be used for MU-MIMO BF training and transmission as described above. FIG. 9 is a block diagram illustrating the configuration of an exemplary initiator 900 capable of MU-MIMO transmission in accordance with an embodiment of the present disclosure. The initiator 900 is a wireless communication device that may be configured to implement the various processes as described herein. The initiator 900 may be an AP or PCP and equipped with one or more DMG antennas, e.g., 901-904.

The initiator 900 includes a processor 910, memory 920, a signal processor 930 and a wireless interface 940 coupled to the antennas 901-904. The processor 910 may be a main processor, e.g., a central processing unit (CPU) and controls the operations of the initiator 900. The memory 920 may include both read-only memory (ROM) and random access memory (RAM) and can provide instructions and data to the processor 910. The processor 910 typically performs logical and arithmetic operations based on program instructions stored within the memory 920. The instructions in the memory 910 may be executable to implement the processes and methods described herein.

The initiator 900 also includes a signal processor 930 and a wireless interface 940 having transceivers 941 for transmission and reception of data between the initiator 900 and another wireless device, One or more DMG antennas, e.g., 901-904, are coupled to the transceivers 941. The transceivers 941 may be hybrid transceivers including a combination of analog beamformers in the RF domain, together with a smaller number of digital beamformers in the baseband.

During operation, the transceivers 941 receive RF signals from the antennas 901-904, convert them to baseband signals and send them to the signal processor 930. The transceivers 940 also convert received baseband signals from the processor, convert them to RF signals, and transmit them through the antennas 901-904. The wireless interface 940 may also include its own memory 942 for storing feedback information.

The signal processor 930 processes the received baseband signals and invokes different functional modules to process the signals according to the BF training and transmission processes as described herein. For example, the signal processor 930 includes a channel estimator 931, MIMO encoder 932, a precoder beamformer 933, a scheduler 934, and an orthogonal waveform generator 935, as well as a wide range of other components that are well known in the art, such as a modulator, a Fourier Transformer unit, a pulse shaping filter, a subcarrier mapping unit, etc. Various components in the signal processor 930 can be implemented in any suitable configuration. The signal processor 930 may be implemented as hardware logic (e.g., integrated in the main processor 910), software logic (stored in the memory 920) or a combination thereof.

Figure 10:
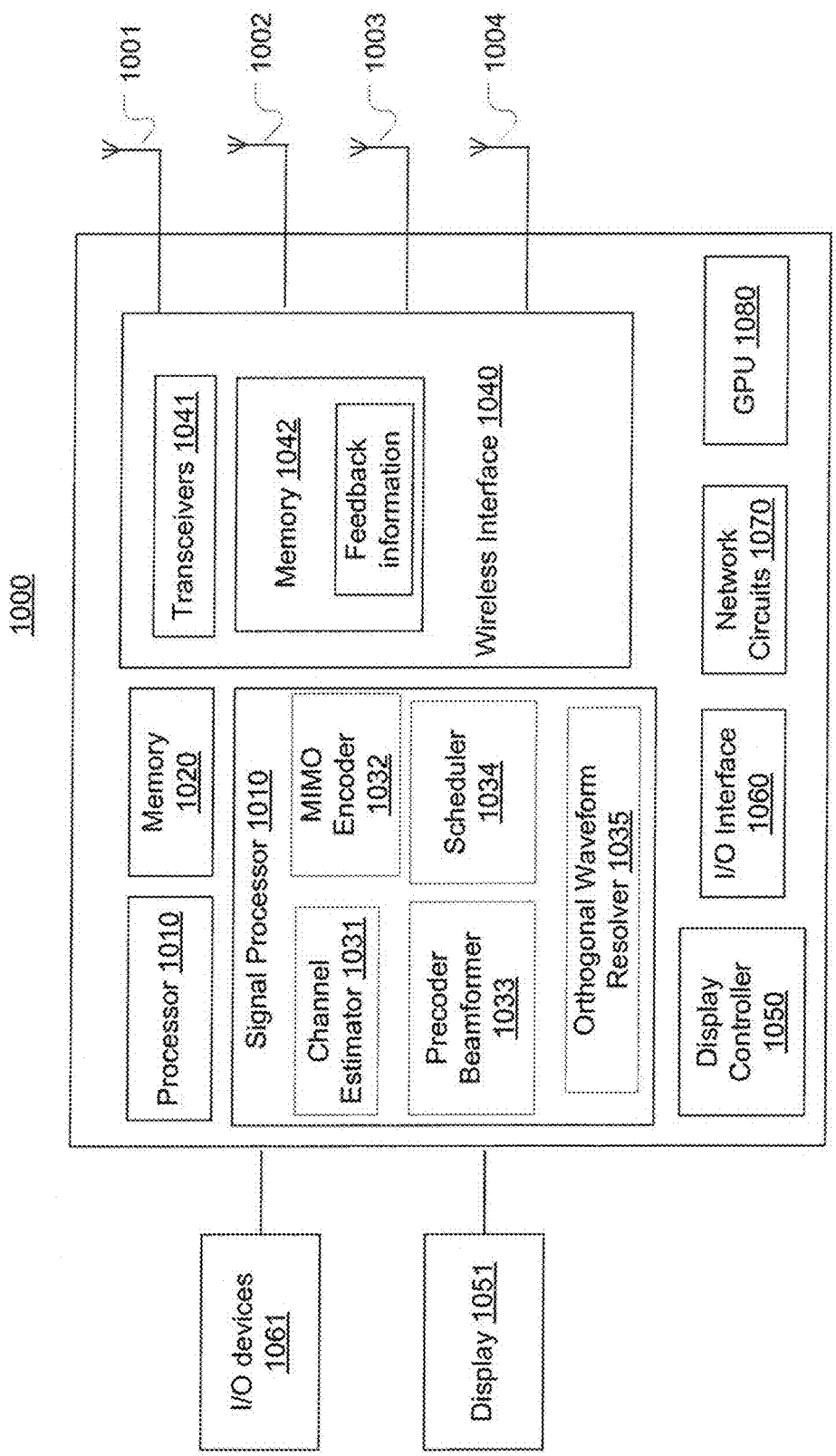
FIG. 10 is a block diagram illustrating the configuration of an exemplary responder device capable of MU-MIMO data transmission in accordance with an embodiment of the present disclosure.

FIG. 10 is a block diagram illustrating the configuration of an exemplary responder 1000 capable of MU-MIMO transmission in accordance with an embodiment of the present disclosure. The responder 1000 may be configured to implement the various processes as described herein. The responder 1000 may be any type or wireless terminal devices, such as a personal computer (desktop or laptop), a server, a smartphone, a touchpad, a laptop, a game console, or a smart TV, etc.

Similar with the initiator 900, the responder 1000 also includes a processor 1010, memory 1020, a signal processor 1030 and a wireless interface 1040 coupled to the antennas 1001-1004. The processor 1010 may be a main processor, e.g., a central processing unit (CPU) and controls the operations of the initiator 1000. The memory 1020 may include both read-only memory (ROM) and random access memory (RAM) and can provide instructions and data to the processor 1010. A portion of the memory 1020 may also include non-volatile random access memory (NVRAM). The processor 1010 typically performs logical and arithmetic operations based on program instructions stored within the memory 1020. The instructions in the memory 1010 may be executable to implement the processes and methods described herein.

The responder 1000 also includes a signal processor 1030 and a wireless interface 1040 having hybrid transceivers 1041 for transmission and reception of data between the initiator 1000 and another wireless device. One or more DMG antennas, e.g., 1001-1004, are coupled to the transceivers 1041. More specifically, the transceivers 1041 receive RF signals from the antennas 1001-1004, convert them to baseband signals and send them to the signal processor 1030. The transceivers 1040 also convert received baseband signals from the processor, convert them to RF signals, and transmit them through the antennas 1001-1004. The wireless interface 1040 may also include its own memory 1042 for storing feedback information.

The signal processor 1030 processes the received baseband signals and invokes different functional modules to process the signals according to the BF training and transmission processes as described herein. For example, the signal processor 1030 includes a channel estimator 1031, MIMO encoder 1032, a precoder beamformer 1033, a scheduler 1034, and an orthogonal waveform resolver 1035, as well as a wide range of other components that are well known in the art, such as a modulator, a Fourier Transformer unit, a pulse shaping filter, subcarrier mapping unit, etc. Various components in the signal processor 1030 can be implemented in any suitable configuration. The signal processor 1030 may be implemented as hardware logic (e.g., integrated in the main processor 1010), software logic (stored in the memory 1020) or a combination thereof.

The responder 1000 may additionally include a Graphics Processing Unit (GPU) 1080, network circuits 1070, Input/Output (I/O) interfaces 1060, a display controller 1050, I/O devices 1061 and a display 1051, as well as many other components that are well known in the art.

Figure 11:
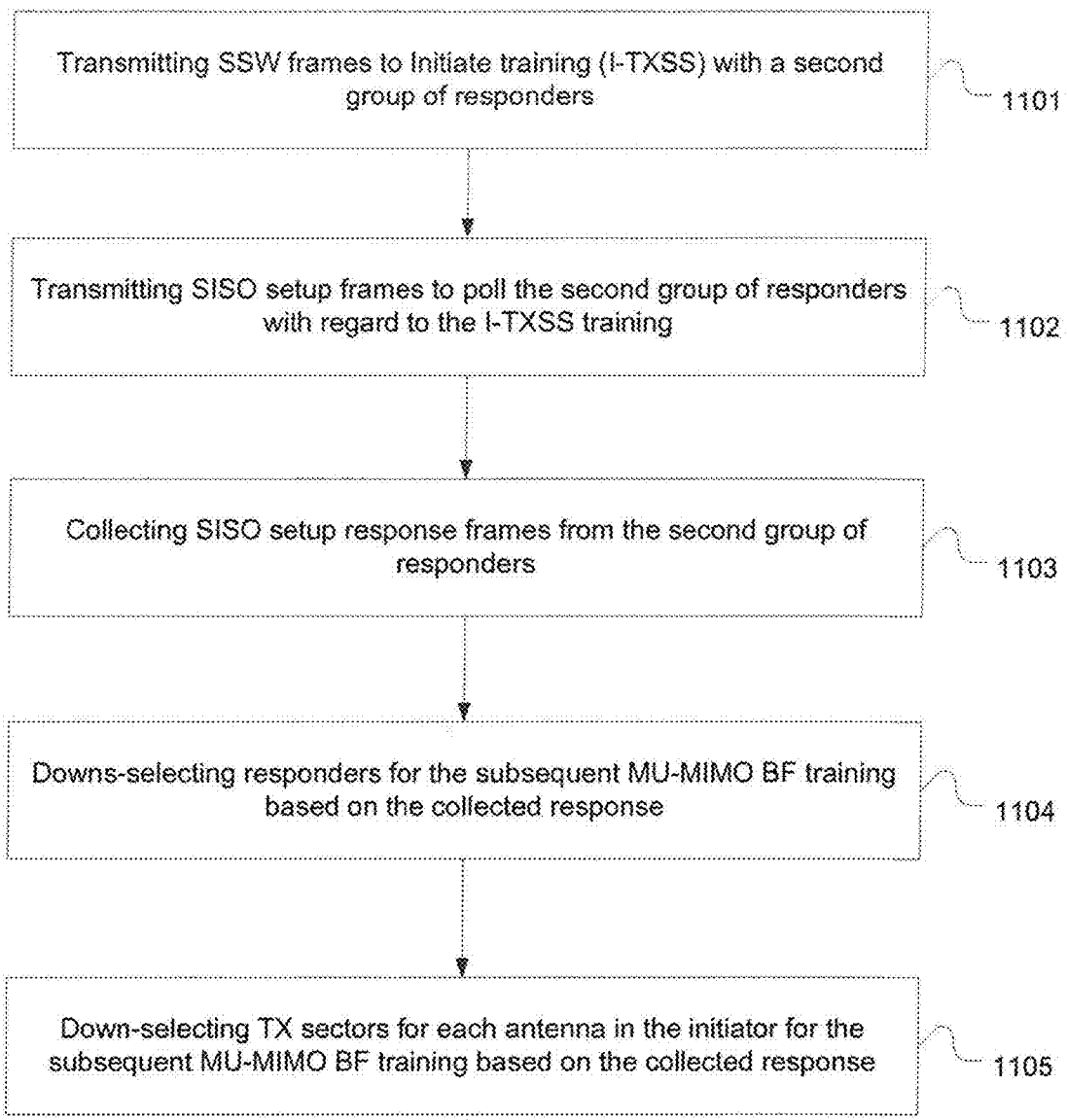
FIG. 11 is a flow chart depicting an exemplary process of determining selected TX sectors and selected responders for a subsequent MU-MIMO BF training session in accordance with an embodiment of the present disclosure.

FIG. 11 is a flow chart depicting an exemplary process 1100 of determining selected X sectors and selected responders for a subsequent MU-MIMO BF training session in accordance with an embodiment of the present disclosure. Process 1100 corresponds to the first phase as described in greater detail with reference to FIG. 1. Process 1100 can be performed by an initiator device, e.g., initiator 900 in FIG. 9. Prior to the process 1100, a control PHY link exists between the initiator and each of the intended responders.

More specifically, at 1101, the initiator transmits Short SSW frames to the responders (a second group of responders) to initiate I-TXSS training therebetween. At 1102, SIMO setup frames are transmitted to poll the second group of responders regarding results from the I-TXSS training. At 1103, SISO setup response frames are collected from the second group of responders, which include the signal quality information on TX sector-RX sector pairs resulting from the I-TXSS training.

At 1104, the initiator selects (e.g., down-selects) a first group of responders from the second group for the subsequent MU-MIMO BF training based on the collected SISO responses. At 1105, the initiator selects (e.g., down-selects) TX sectors for each initiator antenna for the subsequent MU-MIMO BF training based on the collected SISO responses. It will be appreciated that down-selection of TX sectors and responders can be performed according to any suitable metrics, criteria, algorithms, methods or processes that are well known in the art.

Figure 12:
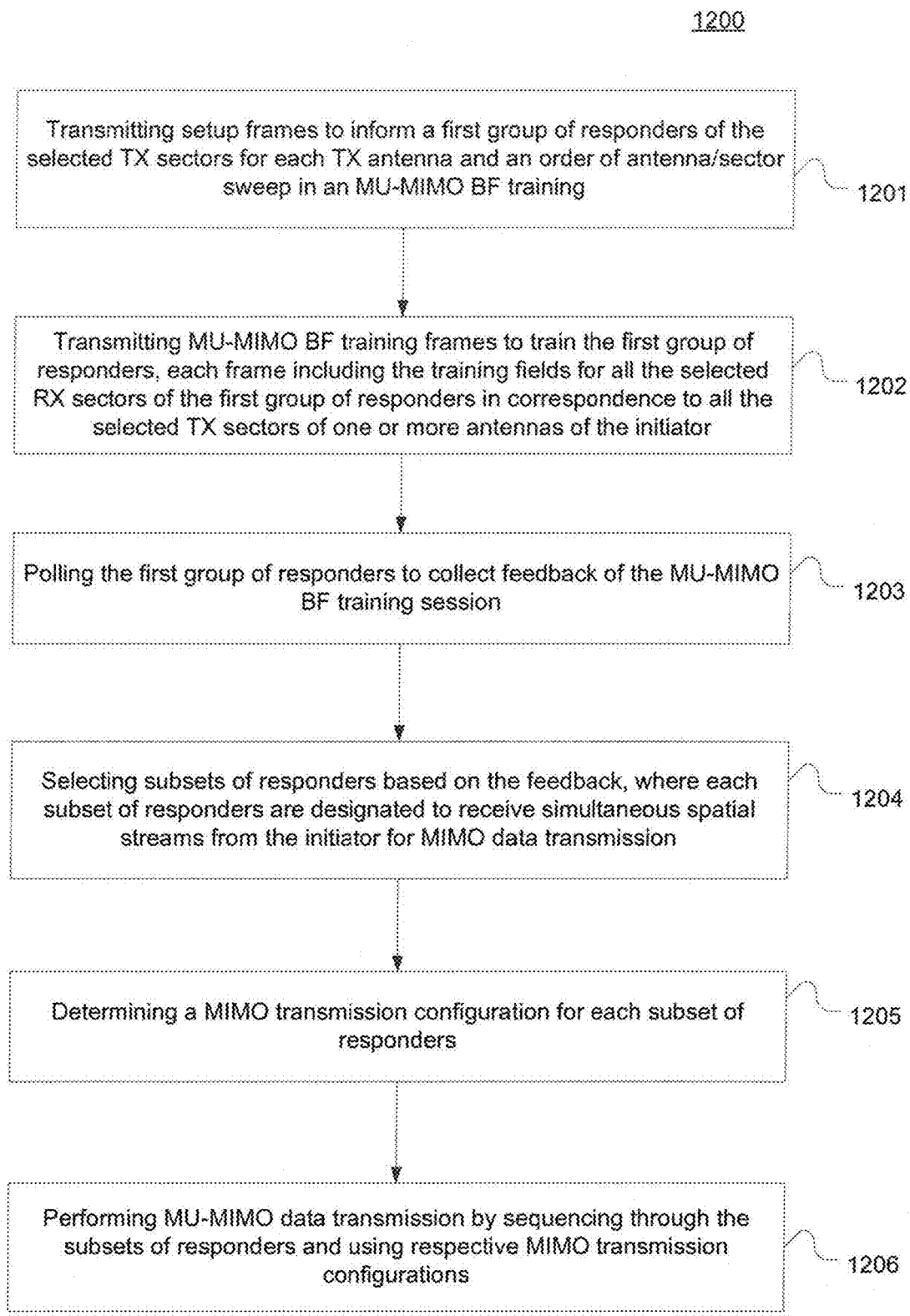
FIG. 12 is a flow chart depicting an exemplary process of MU-MIMO BF training performed by an initiator in accordance with an embodiment of the present disclosure.

FIG. 12 is a flow chart depicting an exemplary process 1200 of MU-MIMO BF training performed by an initiator in accordance with an embodiment of the present disclosure. Process 1200 corresponds to the second phase as described in greater detail with reference to FIG. 1. Process 1200 can be performed by an initiator, e.g., initiator 900 in FIG. 9. More specifically, at 1201, the initiator transmits setup frames to inform a first group of responders (down-selected from a larger group in the first phase) of the selected TX sectors for each TX antenna, and an order of antenna/sector sweep in the coming MU-MIMO BF training session.

At 1202, MU-MIMO BF training frames are transmitted to train the first group of responders, each frame including the training fields for all the selected RX sectors of the first group of responders corresponding to all the selected TX sectors of one or more selected antennas, as described in greater detail with reference to FIGS. 5-7. At 1203, the initiator polls the first group of responders to collect feedback on the MU-MIMO BF training session.

At 1204, a plurality of subsets of responders are selected from the first group of responders based on the feedback. Each subset of responders are designated to receive simultaneous spatial streams from different initiator TX antennas in the subsequent MU-MIMO data transmission. At 1205, a MIMO transmission configuration is determined for each subset of responders. Selection frames including the transmission configuration is sent to the intended responders. At 1206, the initiator sequences through the plurality of subsets of responders for MU-MIMO data transmission by using corresponding configurations. For each subset of responders, the initiator transmits simultaneous spatial streams using different initiator TX antennas.

Figure 13:
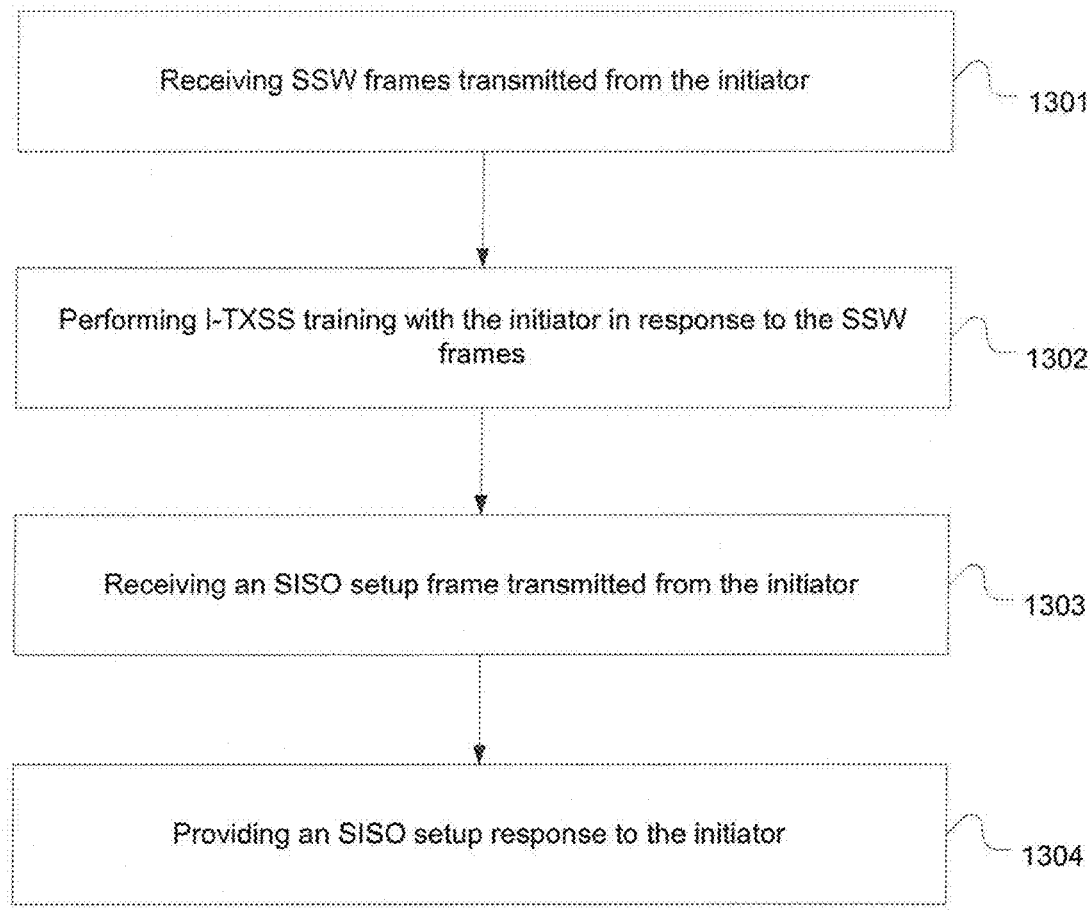
FIG. 13 is a flow chart depicting an exemplary process of performing I-TXSS training and providing feedback for an initiator device to determine selected X sectors and selected responders for a subsequent MU-MIMO BF training session in accordance with an embodiment of the present disclosure.

FIG. 13 is a flow chart depicting an exemplary process 1300 of I-TXSS training and proving feedback to determine selected TX sectors and selected responders for a subsequent MU-MIMO BF training session in accordance with an embodiment of the present disclosure. Process 1300 corresponds to the first phase as described in greater detail with reference to FIG. 1 and can be performed by a responder, e.g., responder 1000 in FIG. 10. Prior to the process 1300, a control PHY link exists between the initiator and the instant responder.

More specifically, at 1301, the responder receives a Short SSW frame transmitted from the initiator. If the responder determines that it is an intended responder, it participates the I-TXSS training with the initiator at 1302. At 1303, the responder receives an SISO setup frame transmitted from the initiator that requests feedback from the I-TXSS training. At 1304, the responder transmits an SISO setup response frame to the initiator, which includes the signal quality information on TX sector-RX sector pairs resulting from the I-TXSS training.

Figure 14:
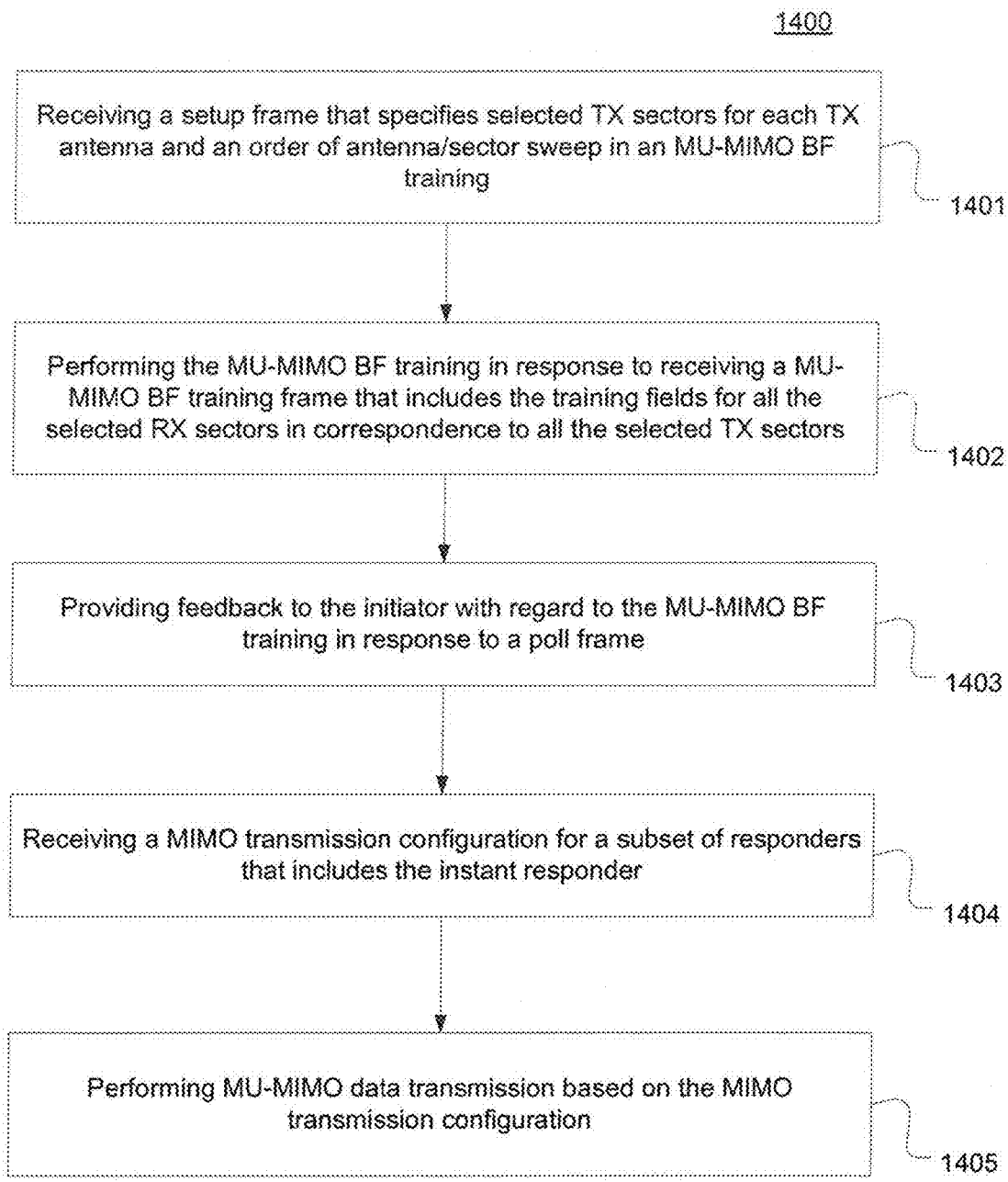
FIG. 14 is a flow chart depicting an exemplary process of MU-MIMO BF training performed by a responder device in accordance with an embodiment of the present disclosure.

FIG. 14 is a flow chart depicting an exemplary process 1400 of MU-MIMO BF training performed by a responder in accordance with an embodiment of the present disclosure. Process 1400 corresponds to the second phase as described in greater detail with reference to FIG. 1. Process 1400 can be performed by a responder device, e.g., responder 1000 in FIG. 10. More specifically, at 1401, the responder receives a setup frame that specifies selected TX sectors of each TX antenna, and an order of antenna/sector sweeping in the coming MU-MIMO training session.

At 1402, the responder performs the MU-MIMO BF training in response to receiving a MU-MIMO BF training frame. The training frame includes the training fields for all the selected RX sectors of a group of responders corresponding to all the selected TX sectors of one or more TX antenna of the initiator.

At 1403, after the BF training session and in response to a poll frame transmitted from the initiator, the responder provides feedback information on the training session. At 1404, the responder receives a selection frame indicating an MIMO transmission configuration for a subset of responders that includes the instant responder.

At 1404, the responder performs MU-MIMO data transmission based on the MIMO transmission configuration.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising,
    at an initiator device comprising one or more antennas,
        informing a first group of responder devices of a Multi-User Multiple Input Multiple Output (MU-MIMO) Beamforming (BF) training session, wherein said informing comprises specifying a first set of TX sectors that comprise selected TX sectors of said one or more antennas;
        transmitting training data units to said first group of responder devices to initiate said MU-MIMO BF training session, wherein the training data units correspond to said first set of TX sectors and a first set of RX sectors comprising selected RX sectors of each of said first group of responder devices;
        polling said first group of responder devices to collect feedback information resulting from said MU-MIMO BF training session;
        based on said feedback information, arranging said first group of responder devices into one or multiple subsets; and
        communicating respective MU-MIMO transmission configurations to said one or multiple subsets, wherein each MU-MIMO transmission configuration specifies a plurality of RX antenna sector and TX antenna sector pairs selected from said first set of TX sectors and said first set of RX sectors, wherein said plurality of RX sector and TX sector pairs are specified for simultaneous MIMO data transmission between a corresponding subset and said initiator device.

2. The method of claim 1 further comprising transmitting MU-MIMO data frames from said initiator device to said one or multiple subsets of responder devices, wherein each concurrent transmission of a MU-MIMO data frame is directed to responders of a subset selected among said one or multiple subsets and uses a corresponding MU-MIMO transmission configuration.

3. The method of claim 1, wherein said informing further comprises specifying in a BF setup frame:
   identifiers of said first group of responder devices;
   an identifier of said MU-MIMO BF training session;
   a training type of said MU-MIMO BF training session; and
   first set of TX sectors in said MU-MIMO BF training session.

4. The method of claim 1 further comprising, prior to said informing:
   polling a second group of responder devices in a Single Input Single Output (SISO) manner to collect feedback information on quality indicators of TX sectors of each antenna in said one or more antennas;
   selecting said first set of TX sectors based on a result of said polling.

5. The method of claim 4 further comprising performing an Initiator-Transmit Sector Sweep (I-TXSS) process for training with said second group of responder devices prior to said polling said second group of responder devices.

6. The method of claim 1, wherein said arranging comprises:
   computing Signal-to-Interference Plus Ratios (SINRs) based on said feedback information; an
   determining said plurality of pairs of RX sector and TX sector based on SINRs.

7. The method of claim 1, wherein each training data unit is a Beam Refinement Protocol (BRP) frame, wherein a number of training fields in said BRP frame equals a number of TX sectors in said first set of TX sectors multiplied by a number of RX sectors of a responder device that has a maximum number of selected RX sectors among said first group of responder devices.

8. The method of claim 1, wherein said MU-MIMO training session comprises one or more of: TX training; RX training; and TX-RX combined training, and wherein said method further comprises one or more of: training RX sectors of multiple responders simultaneously; and training TX antennas simultaneously using orthogonal training fields/frames.

9. The method of claim 1, wherein said polling comprises transmitting a poll frame comprising:
   an identifier of a polled responder device;
   an identifier of said MU-MIMO BF training session; and
   requested feedback information comprising one or more of: Received Signal Strength Indication (RSSI); time domain channel response; and Channel State Information (CSI).

10. The method of claim 1, wherein said communicating comprises transmitting a BF selection frame to each responder device in said one or multiple subsets, and wherein said BF selection frame comprises:
    an identifier of said MU-MIMO BF training;
    one or more MU-MIMO transmission configurations; and
    identifiers of intended responder devices for each MU-MIMO transmission configuration.

11. An initiator device comprising:
    a memory;
    a processor coupled to said memory; and
    a wireless communication interface coupled to said processor and comprising: an antenna array comprising one or more antennas; and a transceiver array coupled to said antenna array and comprising beamforming circuitry, and wherein said memory comprises instructions, that when executed by said processor, cause said initiator device to perform a method of:
    transmitting setup information to a first group of responder devices for a Multi-User Multiple Input Multiple Output (MU-MIMO) Beamforming (BF) training session, wherein said setup information comprises a first set of TX sectors comprising selected TX sectors of said antenna array for said MU-MIMO BF training session;
    transmitting training data units to said first group of responder device to initiate said MU-MIMO BF training session, wherein each training data unit specifies a first set of RX sectors corresponding to said first set of TX sectors for said MU-MIMO BF training session, and wherein said first set of RX sectors comprise selected RX sectors of each of said first group of responder devices;
    polling said first group of responder devices to collect feedback information resulting from said MU-MIMO BF training session;
    based on said feedback information, arranging said first group of responder devices into one or more subsets; and
    communicating respective MU-MIMO transmission configurations to said subsets, wherein each MU-MIMO transmission configuration specifies a plurality of RX sector and TX sector pairs selected from said first set of TX sectors and said first set of RX sectors, wherein plurality of RX sector and TX sector pairs are operable for simultaneous MIMO data transmission between a corresponding subset of responder devices and said initiator device.

12. The initiator device of claim 11, wherein said method further comprises transmitting MU-MIMO data frames from said wireless communication interface to said one or multiple subsets by sequencing through said one or multiple subsets and using said respective MU-MIMO transmission configurations.

13. The initiator device of claim 11, wherein said transmitting said setup information comprises simultaneously transmitting BF setup frames to multiple responder devices from said first group of responder devices, and wherein said setup information further comprises:
    said first set of TX sectors in said MU-MIMO BF training session; and
    a number of antennas in said antenna array configured to transmit orthogonal waveforms simultaneously.

14. The initiator device of claim 11, wherein said method further comprises, prior to said transmitting said setup information:
    polling a second group of responder devices in a Single Input Single Output (SISO) manner to collect feedback information on quality indicators of TX sectors of each antenna in said antenna array;
    selecting said first set of TX sectors based on a result of said polling; and
    selecting said first group of responder devices from said second group of responder devices based on expected MU interference in MU-MIMO BF transmission.

15. The initiator device of claim 14, wherein said method further comprises performing an Initiator-Transmit Sector Sweep (I-TXSS) process for training with said second group of responder devices prior to said polling said second group of responder devices.

16. The initiator device of claim 11, wherein said transmitting training data units comprises transmitting a Beam Refinement Protocol (BRP) frame to multiple responder devices from said first group of responder devices.

17. The initiator device of claim 11, wherein said polling comprises transmitting a poll frame to a polled responder device, wherein said poll frame comprises:
   an identifier of said polled responder device;
   an identifier of said MU-MIMO BF training; and
   requested feedback information comprising one or more of: Received Signal Strength Indication (RSSI); time domain channel response; and Channel State Information (CSI).

18. The initiator device of claim 11, wherein said communicating comprises transmitting a BF selection frame to each responder device in said one or more subsets, wherein said BF selection frame comprises:
   an identifier of said MU-MIMO BF training;
   one or more MU-MIMO transmission configurations; and
   identifiers of responder devices selected for each of said one or more MU-MIMO transmission configurations.

19. A method of wireless communication, said method comprising:
   at a responder device, receiving setup information from an initiator device for a Multi-User Multiple Input Multiple Output (MU-MIMO) Beamforming (BF) training session, wherein said setup information specifies a first set of TX sectors comprising selected TX sectors of an antenna array of said indicator device for said MU-MIMO BF training session;
   in response to a training data unit transmitted from said initiator device, performing said MU-MIMO BF training session, wherein said training data unit specifies a first set of RX sectors corresponding to said first set of TX sectors for said MU-MIMO BF training session, and wherein said first set of RX sectors comprise selected RX sectors of each of a first group of responder devices, and wherein said first group of responder devices comprise said responder device;
   in response to a polling data unit from said initiator device, transmitting first feedback information resulting from said MU-MIMO BF training session to said initiator device;
   receiving a selection data unit from said initiator device, wherein said selection data unit comprises an MU-MIMO transmission configuration that specifies a plurality of RX sector and TX sector pairs selected from said first set of TX sectors and said first set of RX sectors, wherein said plurality of RX sector and TX sector pairs are operable for simultaneous MIMO data transmission between a subset of responder devices and said initiator device, wherein said subset of responder devices are selected from said first group of responder devices and comprise said responder device; and
   transmitting data with said initiator device in accordance with said MU-MIMO transmission configuration.

20. The method of claim 19, wherein said setup information specifies:
   said first set of TX sectors in said MU-MIMO BF training; and
   a number of antennas in said antenna array configured to transmit orthogonal waveforms simultaneously.

21. The method of claim 19 further comprising, in response to polling by said initiator device, transmitting second feedback information comprising quality indicators of TX sectors of each antenna in said antenna array resulting from a training session that uses an Initiator-Transmit Sector Sweep (I-TXSS) process.

22. The method of claim 19, wherein said MU-MIMO training session comprises one or more of: TX training; RX training; and TX-RX combined training.

23. The method of claim 19, wherein said training data unit comprises a Beam Refinement Protocol (BRP) frame, wherein a number of training fields in said BRP frame equals a number of TX sectors in said first set of TX sectors multiplied by a number of RX sectors of a particular responder device that has a maximum number of selected sectors among said first group of responder devices.

24. The method of claim 19, wherein said first feedback information comprises one or more of: Received Signal Strength Indication (RSSI); time domain channel response; and Channel State Information (CSI).

25. A responder device comprising:
   a memory;
   a processor coupled to said memory; and
   a wireless communication interface coupled to said processor and comprising: an antenna array comprising one or more antennas; and a transceiver array coupled to said antenna array, and
   wherein said memory comprises instructions, that when executed by said processor, cause said responder device to perform a method of:
      receiving setup information from an initiator device for a Multi-User Multiple Input Multiple Output (MU-MIMO) Beamforming (BF) training session, wherein said setup information specifies a first set of TX sectors comprising selected TX sectors of an antenna array of said initiator device for said MU-MIMO BF training;
      in response to a training data unit transmitted from said initiator device, performing said MU-MIMO BF training session, wherein said training data unit specifies a first set of RX sectors corresponding to said first set of TX sectors for said MU-MIMO BF training session, and wherein said first set of RX sectors comprise selected RX sectors of each of a first group of responder devices, and wherein said first group of responder devices comprises said responder device;
      in response to a polling data unit from said initiator device, transmitting first feedback information resulting from said MU-MIMO BF training session to said initiator device;
      receiving a selection data unit from said initiator device, wherein said selection data unit comprises an MU-MIMO transmission configuration that specifies a plurality of RX sector and TX sector pairs selected from said first set of TX sectors and said first set of RX sectors for simultaneous MIMO data transmission between a subset of responder devices and said initiator device, wherein said subset of responder devices are selected from said first group of responder devices and comprises said responder device; and
      transmitting data with said initiator device in accordance with said MU-MIMO transmission configuration.

26. The responder device of claim 25, wherein said setup information specifies:
   said first set of TX sectors in said MU-MIMO BF training session; and
   a number of antennas in said initiator device configured to transmit orthogonal waveforms simultaneously.

27. The responder device of claim 25, wherein said method further comprises transmitting second feedback information comprising quality indicators of TX sectors of each antenna of said initiator device resulting from a training session that uses an Initiator-Transmit Sector Sweep (I-TXSS) process.

28. The responder device of claim 25, wherein said training data unit is a Beam Refinement Protocol (BRP) frame, wherein a number of training fields in said BRP frame equals a number of TX sectors in said first set of TX sectors multiplied by a number of RX sectors of a particular responder device that has a maximum number of selected sectors among said first group of responder devices.

29. The method of claim 25, wherein said first feedback information comprises one or more of: Received Signal Strength Indication (RSSI); time domain channel response; and Channel State Information (CSI).

\* \* \* \* \*